Dec. 19, 1961   R. D. NELSON ET AL   3,014,158
GROUND LEVEL TRANSFORMER
Filed July 3, 1959   4 Sheets-Sheet 1
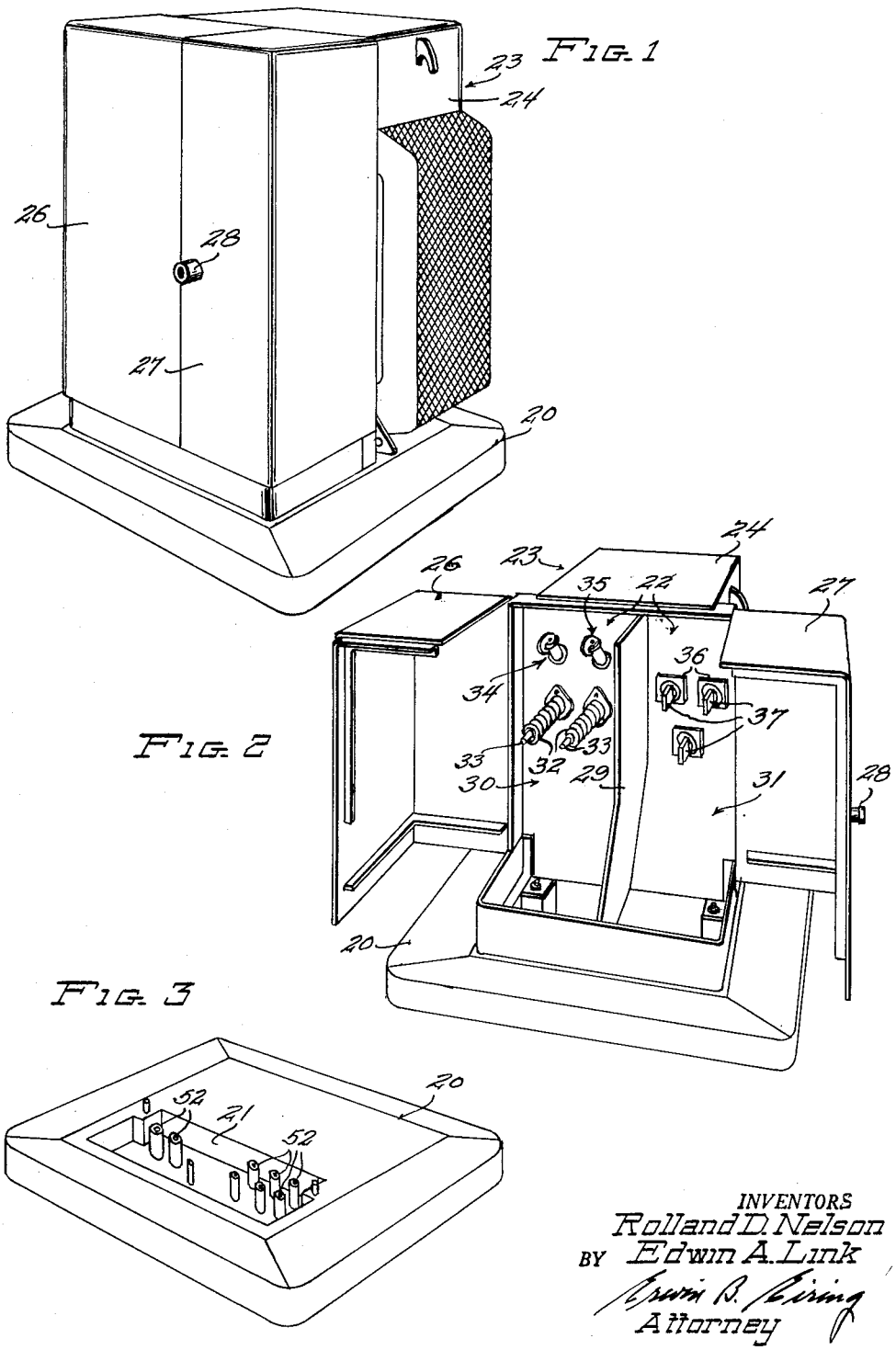
INVENTORS
Rolland D. Nelson
BY Edwin A. Link
Attorney INVENTORS
Rolland D. Nelson
Edwin A. Link
BY
Attorney

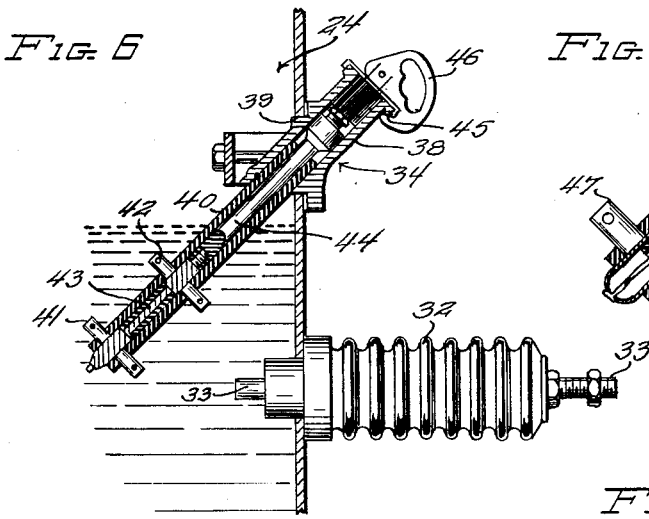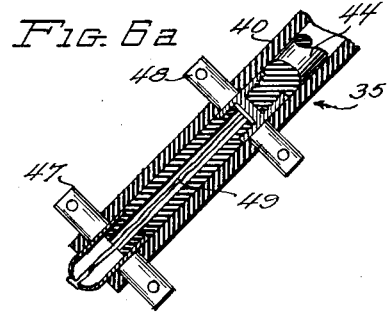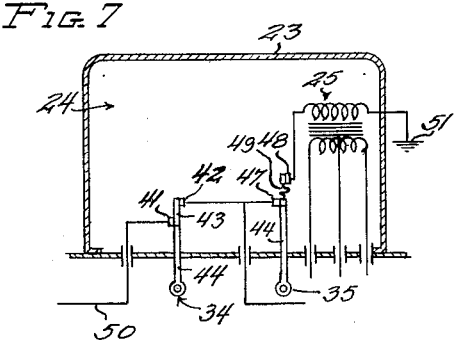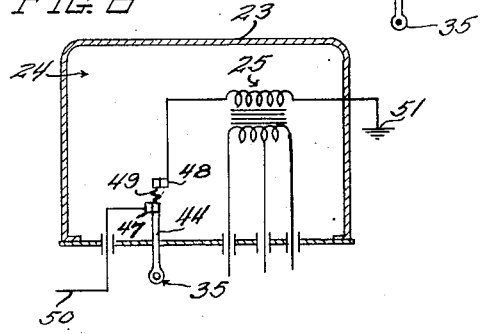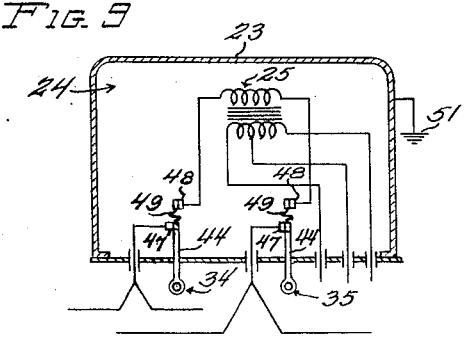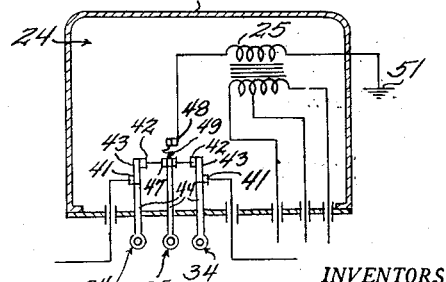

Dec. 19, 1961
R. D. NELSON ET AL
3,014,158
GROUND LEVEL TRANSFORMER
Filed July 3, 1959
4 Sheets-Sheet 4
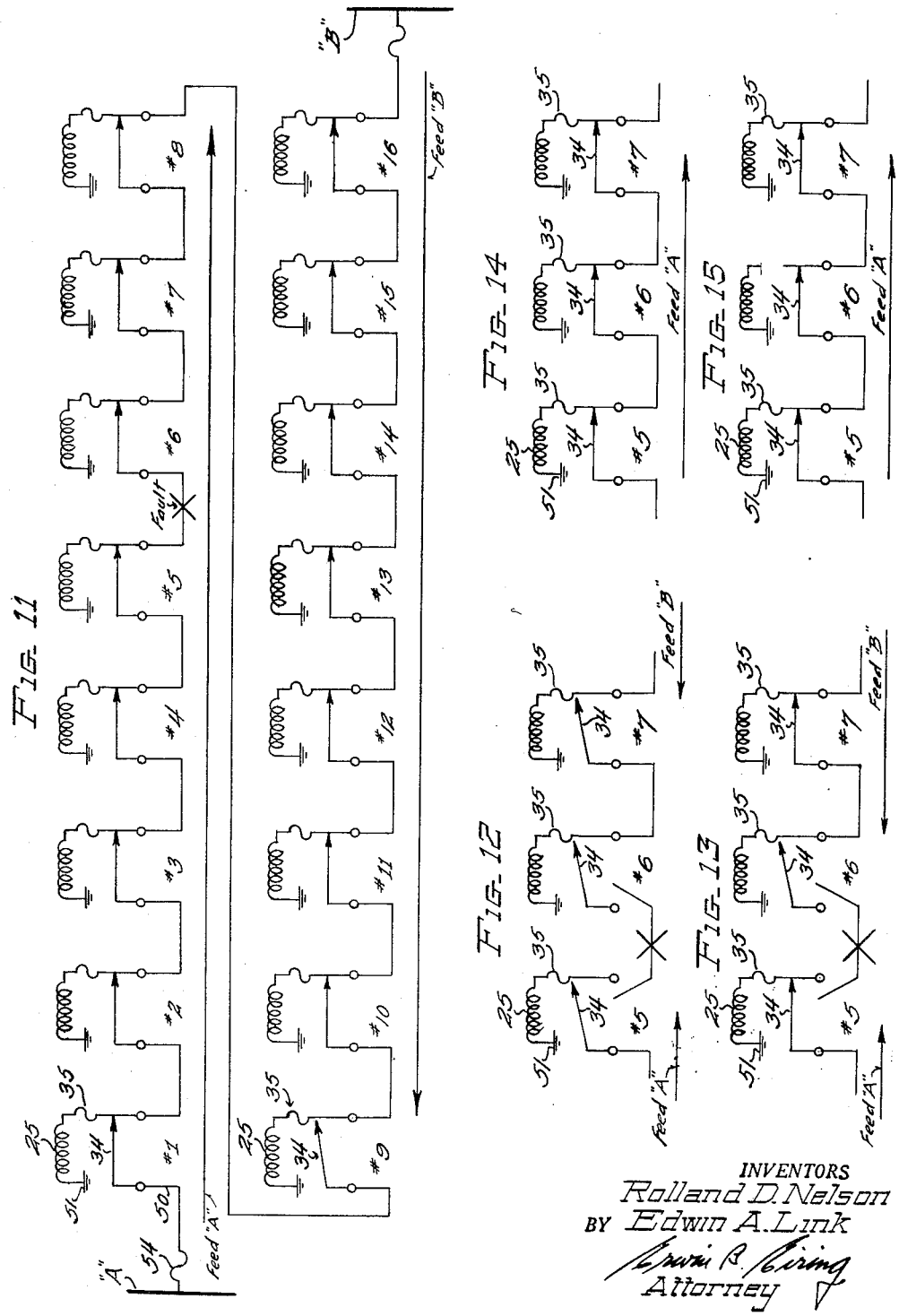
INVENTORS
Rolland D. Nelson
BY Edwin A. Link
Attorney

United States Patent Office 3,014,158
Patented Dec. 19, 1961

3,014,158
GROUND LEVEL TRANSFORMER
Rolland D. Nelson, Hales Corners, and Edwin A. Link, Waukesha, Wis., assignors to RT & E Corporation, Waukesha, Wis., a corporation of Wisconsin
Filed July 3, 1959, Ser. No. 824,869
12 Claims. (Cl. 317—15)

This invention relates to ground level transformers adapted primarily for use in conjunction with underground distribution systems.

The primary object of the present invention resides in the provision of a new and improved ground level transformer that is self-contained.

Another object resides in the provision of a ground level transformer wherein all live parts are enclosed in a locked tamper-proof housing.

Another object of the invention resides in the provision of a ground level transformer that does not require either a separate enclosure or separate protective equipment for its installation.

Another object resides in the provision of a unitary ground level transformer comprising a housing containing two compartments, one of which is an inaccessible oil containing compartment within which a transformer and its associated circuitry is mounted and the other of which comprises an accessible compartment within which high and low voltage bushings together with manually operable means through which a switch, disposed within the inaccessible compartment, may be selectively connected into or disconnected from the transformer circuitry.

Another object resides in the provision in a ground level transformer, of the above described type, of a fuse, disposed within the inaccessible compartment of the housing, that may be selectively connected into or disconnected from the transformer circuitry through manually operable means disposed within the accessible compartment of the housing.

Another object resides in the provision in a ground level transformer, of the above described type, of high and low voltage bushings having electrical connections with the transformer contained within the inaccessible compartment of the housing and exposed portions within the accessible compartment of the housing to facilitate the connection of the transformer in an underground power distribution system.

Another object resides in the provision in a ground level transformer, of the above described type, of switch and fuse elements that are removably insertible into the inaccessible transformer containing compartment from the accessible compartment of the housing.

Another object resides in the provision in a ground level transformer, of the above described type, of a pair of cooperating elements one of which is in the form of a tubular support fixedly positioned in sealing contact with the inaccessible compartment of the housing and the other of which is a bayonet assembly removably insertible in the inaccessible compartment through the support, the bayonet assembly including either a bridging switch or a fusible element whereby spaced electrical contacts within the inaccessible compartment, below the level of oil therein, may be selectively connected or disconnected by the application or removal of the bayonet assembly from the support.

Another object resides in the provision in an underground power distribution system of a plurality of loop connected ground level transformers of the type that may be individually controlled so as to effect the sectionalizing of the power distribution system in order to facilitate the location of a fault therein.

Another object resides in the provision in an underground power distribution system of a plurality of loop connected ground level transformers whereby a sectionalized portion of the system may be isolated during the correction of a fault within a sectionalized portion of the system.

Other objects and advantages will become apparent from the following description of an illustrative embodiment of the present invention.

In the drawing:

FIGURE 1 is a perspective view of a ground level transformer, constructed in accordance with the teachings of the present invention, shown in position on a mounting pad;

FIG. 2 is a view similar to FIG. 1 showing the tamper-proof closures for the accessible compartment of the transformer housing in open position;

FIG. 3 is a perspective view of a concrete pad on which the ground level transformer is mounted illustrating conduit means by which power may be led to and from the transformer that forms a part of an underground power distribution system;

Figure 4:
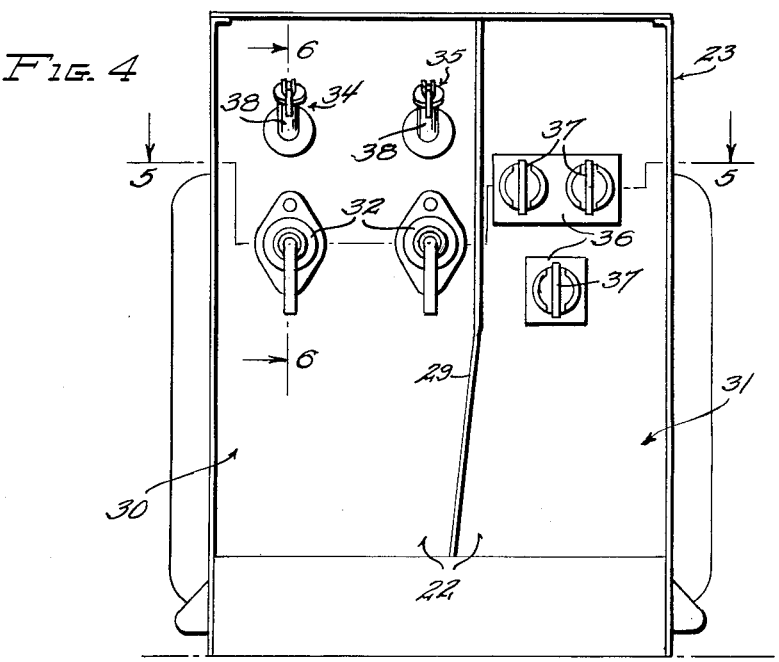
FIG. 4 is a front elevational view of the transformer housing, with the closures removed from the accessible compartment of the housing, showing the accessible portions of the high and low voltage bushings and the switch and fuse operating elements.
Figure 5:
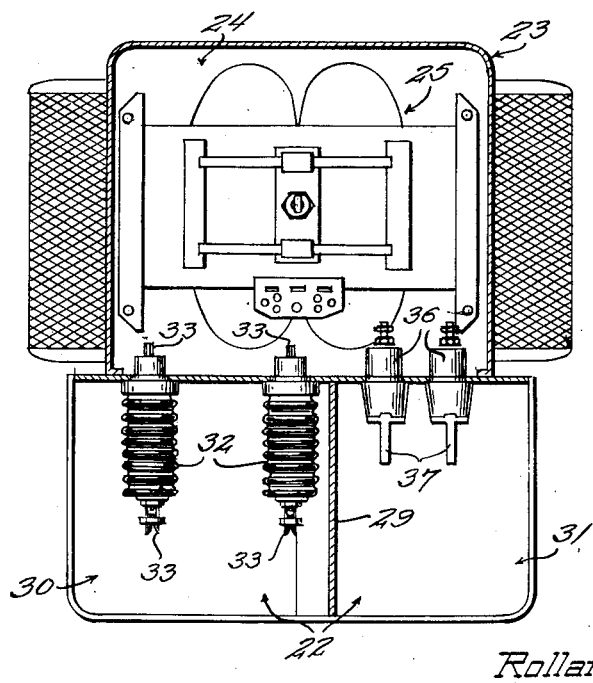

FIG. 5 is a horizontal sectional view, taken substantially along the line 5—5 of FIG. 4, showing the high and low voltage bushings each having one of their ends disposed within the inaccessible compartment of the housing for connection with the transformer circuitry which is contained within a sealed inaccessible compartment of the housing and their outer ends disposed within the accessible compartment of the housing;

FIG. 6 is a vertical sectional view, taken substantially on the line 6—6 of FIG. 4, showing the mounting of a disconnect switch and bushing both having contacts below the level of oil in the inaccessible compartment together with manually operable means, disposed within the accessible compartment of the housing, which may be manipulated to selectively open and close the transformer circuit;

FIG. 6a is a fragmentary view of the lower portion of the removable bayonet member shown in FIG. 6 with a replaceable fuse element substituted for the switch blade;

FIG. 7 is a schematic wiring diagram showing one form of transformer circuitry embodying the teachings of the present invention that includes both a disconnect switch and a fuse located within the inaccessible compartment of the housing and provided with means disposed within the accessible compartment of the housing by which the switch and fuse may be selectively rendered operative or inoperative;

FIG. 8 is a view similar to FIG. 7 showing slightly modified form of transformer circuitry embodying a fuse disposed within the transformer tank below the oil level that may be selectively inserted or removed from the inaccessible compartment through manually operable means disposed within the accessible compartment of the housing;

FIG. 8a is a fragmentary view of a portion of the transformer circuitry shown in FIG. 8 in which the removable fuse forms a part of the high voltage bushing;

FIG. 9 is a view similar to FIG. 7 showing a further modification of the transformer circuitry embodying the use of two fuses in connection with a delta system;

FIG. 10 is a view similar to FIG. 7, showing further modification of the transformer circuitry embodying the use of a pair of disconnect switches and fuse;

FIG. 11 is a schematic wiring diagram of a typical underground distribution system of the ground radial type embodying a plurality of loop connected ground level transformers constructed in accordance with the teachings of the present invention;

FIG. 12 is a view of a fragmentary portion of the circuit shown in FIG. 11 illustrating a method of fault detection in the load circuit;

FIG. 13 is a view similar to FIG. 12 illustrating the isolation of the fault from the load circuit;

FIG. 14 is a view similar to FIG. 12 illustrating the method for locating a fault within a transformer in the circuit; and FIG. 15 shows a method whereby the faulty transformer may be isolated from the circuit.

Before entering into a detailed description of the illustrative embodiments of the ground level transformer of the present invention, it is believed that a brief description of its environs and operating characteristics will serve to emphasize both its novelty and marked advantages.

With the advent of the development of new subdivisions and the change in the living pattern of the typical American, wherein the home owner has become interested in improved facilities for both indoor and outdoor living, he has become increasingly conscious of his surroundings and the presence of utility poles and overhead lines have become disturbing to his aesthetic sense.

In order to alleviate this condition, many suburban residential areas are being provided with underground power distribution systems in preference to the antiquated overhead systems. This trend is rapidly increasing and the present invention affords a means by which ground level transformers may be inconspicuously located at the junction points of adjacent lots so that a single ground level transformer may serve a number of nearby residences.

In addition to improving the general appearance of the community, the ground level transformers, embodying the teachings of the present invention, provide greater protection for both the public and operating personnel of the utility companies since they are self-contained, tamperproof and the high voltage lines are inaccessible to any one except the service men of the utility companies.

Referring more particularly to FIG. 3 of the accompanying drawing, it will be noted that a poured concrete pad 20 provides the means on which the ground level transformer is permanently mounted. A cavity 21 in the pad 20 is provided with suitable conduits affording means through which underground power supply and service lines are led to and from an accessible compartment 22 of a ground level transformer housing 23.

The ground level transformer 23 comprises an inaccessible sealed welded steel oil containing compartment 24 within which a transformer 25 is mounted. A pair of hingedly mounted doors 26 and 27 serve to form a closure for the accessible compartment 22 of the transformer housing 23. A lock 28 is provided for the doors 26 and 27 to preclude unauthorized access to the compartment 22 which contains high voltage lines.

Referring more particularly to FIG. 2 of the accompanying drawing, it will be noted that a partition 29 serves to divide the accessible compartment 22 into separate high and low voltage sections 30 and 31 respectively. A pair of high voltage bushings 32 that extend through the forward wall of the inaccessible compartment 24 each include a conductor 33 having one end disposed within the inaccessible compartment and their other end within the high voltage section 30 of the accessible compartment 22. A load carrying switch assembly 34 and a fuse assembly 35 both of which extend through the forward wall of the inaccessible compartment 24 are provided with manually operable means disposed within the high voltage section 30 of the accessible compartment 22. A plurality of low voltage bushings 36 extend through the forward wall of the inaccessible compartment 24 and are each provided with a conductor 37 having its inner end disposed within the inaccessible compartment 24 and its outer end within the low voltage section 31 of the accessible compartment 22.

The load carrying switch assembly 34 and the fuse assembly 35 are constructed in accordance with the teachings disclosed in U.S. Patent No. 2,918,557, issued December 22, 1959 and comprise, generally, a tubular casting 38 insertible through an opening 39 formed in the forward wall of the inaccessible compartment 24 of the housing 23. Suitable gasket and clamping means are provided to fixedly position each of the switch and fuse assemblies 34 and 35 in sealing contact with the inaccessible compartment 24.

A tubular member 40 formed of insulating material has its upper end fixedly retained within the inner portion of the tubular casting 38. A pair of spacedly positioned contacts 41 and 42, disposed below the level of oil in the inaccessible compartment 24 extend through the wall of the tubular member 40 adjacent its lower extremity. A bridging contact member 43 mounted on the lower extremity of an insulating member 44 that is removably insertible into the tubular member 40 serves to form an electrical connection between the contacts 41 and 42 of the switch assembly 34 when the member 44 is fully inserted into the casting 28. The insulating member 44 is provided with a resilient washer adjacent its upper end that serves to provide a seal for the outer end of the tubular casting 28 when the member 44 is releasably retained in switch closing position under the action of clamping means 45 that form a portion of a switch operating member 46 disposed within the accessible compartment 22 of the housing 23.

The fuse assembly 35 is of identical construction as that shown for the switch assembly 34 save for the fact that it is provided with spaced contacts 47 and 48 adapted to be electrically connected through the medium of a fuse element 49. (See FIG. 6a.)

Referring more particularly to the schematic wiring diagram of the transformer, shown in FIG. 7 of the accompanying drawing which embodies the circuitry of the transformer illustrated in FIGS. 1–6a, it will be noted that a power supply line 50 of high voltage is connected to the end of one of the high voltage bushings 32 disposed within the accessible compartment 22 of the housing 23. The other end of the high voltage bushing 32 is electrically connected to the contact 41 of the switch assembly 34 and the other contact 42 of the switch assembly is connected to the end of the other high voltage bushing 32 disposed within the inaccessible compartment 24 of the housing 23. A lead from the last named bushing is connected to the contact 47 of the fuse assembly 35 and the other contact 48 of the fuse assembly is electrically connected with one end of the primary winding of the transformer 25. The other end of the primary winding of the transformer is connected to a ground 51 to the transformer housing 23. Suitable taps on the secondary winding of the transformer 25 are respectively connected to the ends of the low voltage bushings 36 disposed within the inaccessible compartment 24 of the housing 23. The bridging contact member 42 carried by the removably positionable insulating member 44 of the switch assembly 34 provides a means by which the contacts 41 and 42 of the switch assembly 34 may be selectively connected or disconnected. In a similar manner, the fuse element 49 of the fuse assembly 35 provides the means by which the contacts 47 and 48 of the fuse assembly 35 may be selectively connected or disconnected.

Referring more particularly to FIG. 3 of the accompanying drawing, it will be noted that a plurality of conduits 52 disposed within the cavity 21 of the concrete pad 20 provides a means by which suitable connections may be made between the underground power distribution system and the several exposed ends of the high and low voltage bushings 32 and 36 located within the accessible compartment 22 of the transformer housing 23.

FIG. 8 of the accompanying drawing illustrates a slightly modified form of transformer circuitry utilizing a removably positionable fuse in series connection between a single high voltage bushing and the primary winding of the transformer as the means for selectively making or breaking the transformer circuit.

FIG. 8a is a fragmentary view showing a modification of the circuit shown in FIG. 8. The modification comprises the inclusion of the removable fuse 53 as an integral part of the high voltage bushing.

FIG. 9 is a view similar to that shown in FIG. 7 illustrating a further modification of the transformer circuitry that embodies the use of two fuses in connection with an ungrounded system.

FIG. 10 is a view similar to FIG. 7 showing a further modification of the transformer circuitry embodying the use of a pair of disconnect switches in combination with a removable fuse disposed between the removable switches.

FIG. 11 is a schematic wiring diagram of a typical underground power distribution system of the ground radial type embodying a plurality of loop connected ground level transformers, constructed in accordance with the teachings of the present invention. The illustrated system includes the showing of sixteen transformers, the first eight of which are supplied from a power line "A" and the last eight of which are supplied from a power line "B" by reason of the fact that the disconnect switch 34 of the transformer No. 9 is in open position while all of the other disconnect switches are in closed position to effect the uninterrupted serial connection between the remaining transformers.

The above described system of underground power distribution embodying transformers constructed in accordance with the teachings of the present invention provides a simple and effective means for locating and isolating faults in the circuit. For the purpose of illustrating the simplicity of fault location, let us assume that a fault exists at the point "X" in the cable between transformers 5 and 6. This will result in the opening of a fuse cut-out 54 that is in series connection between the power supply line "A" and the No. 1 transformer. The following procedure will result in prompt location of the fault. Start sectionalizing the circuit by removing the bayonet type disconnect switch 34 in the No. 4 transformer which is in the middle of the deenergized portion of the circuit. Then replace the blown fuse 54 to re-energize the circuit between the transformers 1 and 4. Since the fault is beyond this point, the new fuse 54 will not be blown. Further sectionalize the circuit between transformers 4 and 8 by removing the bayonet disconnect switch 34 in transformer 6 and reinsert the bayonet disconnect switch in transformer 4 to energize the circuit between transformers 1 and 6. Since the fault lies in the line between transformers 5 and 6 the fuse 54 will now blow. This condition will indicate that the fault is either between transformers 4 and 5 or between transformers 5 and 6. To determine the exact point of fault remove the disconnect switch from transformer 5 and replace the blown fuse 54 to re-energize the circuit between transformers 1 and 5. Since the fault is actually in the line between transformers 5 and 6, the fuse 54 will not blow and the fault may be definitely established as being between transformers 5 and 6. With this fact established, service may be restored, on an emergency basis, to all of the circuits except the line circuit in which the fault exists. To accomplish the restoration of service in the remaining portions of the circuit the normally open bayonet switch 34 of transformer 9 is closed to effect the energization of transformer 6, 7 and 8 from the power supply line "B." At this point all the transformers except 5 are in service. Remove the cable connections between transformers 5 and 6 by disconnecting them from the normal power output bushing 32 of transformer 5 and the normal power input bushing 32 of transformer 6. The disconnect switch of transformer 5 may then be replaced and the entire system, save that between transformers 5 and 6 is restored to service on an emergency basis.

The procedure for returning the system to complete normal service requires the repair or replacement of the faulty cable between transformers 5 and 6. After this has been accomplished, remove the bayonet disconnect switch from transformer 5 and reconnect the cable disposed between transformers 5 and 6 to the bushings from which it had previously been disconnected. After this has been accomplished, replace the bayonet disconnect switches in transformers 5 and 6 and remove the bayonet disconnect switch from transformer 9 to put it back in its original normally open position. When this has been accomplished the entire circuit will have been restored to normal service.

The foregoing discussion has related to the location and repair of a fault in the line between adjacent transformers. If the fault lies in a transformer, the high voltage fuse 49 in one of the transformers may blow. If it is not immediately evident that the transformer is faulty and that the fuse may have blown because of a fault in the secondary cable or some other reason, a check may be made to determine the position of the fault. The procedure for checking the cause of the blow-out of the high voltage fuse 49 may be made in the following manner. Assuming that the fault lies in transformer 5, remove the bayonet disconnect switches from transformers 5 and 6. If it is desired, transformers 6, 7 and 8 may be re-energized from the power supply line "B" by replacing the normally open bayonet switch 34 in transformer 9. Remove the blown bayonet type fuse 49 from transformer 5 and replace the blown fuse with a new fuse cartridge. Remove the secondary leads from the low voltage bushings 36 in order to limit the test to the transformer alone. Replace the bayonet disconnect switch 34 in transformer 5 to re-energize transformer 5. If the fuse 54 blows again in transformer 5, it indicates clearly that the fault lies in this transformer. If the fuse stays in, the secondary cables may be reconnected, one at a time, to the low voltage bushings 36 to determine if one of the secondary cables is faulty.

The procedure for cutting out transformer 5, after definitely determining that the fault lies in the transformer, is to remove the bayonet disconnect switch 34 from transformer 3 so that the power output cable disconnection in transformer 4 may be disconnected from the power output high voltage bushing 32 and grounded. Transformer 4 can then be re-energized by replacing the bayonet disconnect switch 34 in transformer 4. Then remove the bayonet disconnect switch 34 from transformer 6 so that the high voltage input cable connection in transformer 6 can be removed from the high voltage input bushing 32 and grounded. The transformer 6 is then re-energized by replacing the bayonet disconnect switch in transformer 6. The faulted transformer 5 may then be replaced.

The procedure for energizing the new transformer 5 and returning the system to normal operation requires the following operations. Remove the bayonet disconnect switches from transformers 4 and 6. Then reconnect the power output cable to the power output bushings 32 of the transformer 4 and the power input cable to the high voltage bushing 32 in transformer 6. Replace the bayonet disconnect switches in transformer 4 to re-energize transformers 4 and 5 from the power supply line "A." If the transformers 7 and 8 have been placed in emergency service through the insertion of the bayonet disconnect switch 34 in transformer 9 (as discussed in connection with the procedure in locating a fault in the cable) the bayonet disconnect switch may be removed to restore the circuit to its original condition. The bayonet disconnect switch may then be reinserted in the transformer 6 and the system is now returned to its normal operating condition.

From the foregoing description of the illustrative embodiment of the present invention, it will readily be seen that a new and improved ground level transformer has been provided for use in conjunction with underground power distribution systems. One of the marked advantages of the present device lies in the fact that it is self-contained, tamper-proof and does not require either a separate enclosure or separate protective equipment for its installation. Another marked advantage of the device is found in the fact that the unitary ground level transformer includes an inaccessible oil containing compartment within which a transformer and its associated circuitry is mounted together with an accessible compartment within which high and low voltage bushings together with manually operable means through which a load carrying disconnect switch and a replaceable fuse may be selectively inserted into or withdrawn from the inaccessible transformer compartment from the accessible compartment. Another marked advantage of the present device is found in the fact that the accessible compartment includes a partition together with a pair of separately hinged doors provided with a lock and arranged in a manner that permits initial access to the low voltage bushing connections through the movement of one of the doors and the subsequent access to the portion of the accessible compartment that contains the high voltage bushings and the load carrying switch and fuse elements that may be selectively inserted into or removed from the transformer circuitry, contained within the inaccessible compartment through manually operable means contained within the accessible compartment. Another marked advantage of the present device resides in the fact that it affords a simple and effective means whereby faults occurring either in the transformer or its associated load line may be located and isolated from an underground power distribution system with great facility.

While the invention has been described in considerable detail in the foregoing specification, it is to be understood that various changes may be made in its embodiments without departing from or sacrificing any of the advantages hereinafter claimed.

We claim:
1. A ground level transformer comprising a housing including two compartments, one of which is an inaccessible oil containing compartment within which a transformer is mounted and the other of which is accessible, a high voltage bushing having one end disposed within said inaccessible compartment and its other end disposed within said accessible compartment, a switch within said inaccessible compartment below the oil level therein, and a manually operable switch controlling element having portions disposed within both of said compartments, said switch being in series connection between said high voltage bushing and the primary winding of the transformer whereby the transformer may be selectively energized by the manipulation of the portion of said switch controlling element disposed within said accessible compartment.

2. A ground level transformer, as set forth in claim 1, in which said manually operable switch controlling element is removably insertible into said inaccessible compartment.

3. A unitary ground level transformer comprising a housing including two compartments, one of which is an inaccessible oil containing compartment within which a transformer is mounted and the other of which is accessible, a pair of high voltage bushings each having one end disposed within said inaccessible compartment and its other end disposed within said accessible compartment, a plurality of low voltage bushings each having one end disposed within said inaccessible compartment and its other end disposed within said accessible compartment, a switch within said inaccessible compartment below the level of oil therein, and manually operable switch controlling element having portions disposed within both of said compartments, said switch being in series connection between one of said high voltage bushings and the primary winding of the transformer whereby the transformer may be selectively energized by the manipulation of the portion of said manually operable switch controlling element disposed within said accessible compartment.

4. A unitary ground level transformer, as set forth in claim 3, in which said manually operable portion of said switch controlling element is removably mounted.

5. A unitary tamper-proof ground level transformer comprising a housing including two compartments, one of which is an inaccessible oil containing compartment within which a transformer is mounted and the other of which is accessible, a pair of high voltage bushings each having one end disposed within said inaccessible compartment and its other end disposed within said accessible compartment, a plurality of low voltage bushings each having one end disposed within said inaccessible compartment and its other end within said accessible compartment, a fuse element within said inaccessible compartment below the level of oil therein and a manually operable element on which said fuse is mounted, said manually operable element having portions disposed within both of said compartments, said fuse element being in series connection between one of said high voltage bushings and the primary winding of the transformer whereby manipulation of the portion of said manually operable element disposed within said accessible compartment serves to selectively make and break connection between one of said high voltage bushings and the primary winding of the transformer within said inaccessible compartment.

6. A unitary tamper-proof ground level transformer, as set forth in claim 5 in which said manually operable portion of said fuse carrying element disposed within said accessible compartment is withdrawably mounted.

7. A self-contained tamper-proof ground level transformer comprising a housing including two compartments having a common wall, one of said compartments providing a sealed oil containing compartment within which a transformer is mounted and the other of said compartments being accessible, a pair of high voltage bushings each having one end disposed within said inaccessible compartment below the oil level therein and their other ends disposed within said accessible compartment, a switch within said inaccessible compartment disposed below the oil level therein, said switch being in series connection between the portions of said high voltage bushings disposed within said inaccessible compartment, a fuse element disposed within said inaccessible compartment disposed below the oil level therein, said fuse element being in series connection between the portion of one of said high voltage bushings disposed within said inaccessible compartment and the primary winding of the transformer, a switch operating means having portions disposed within both of said compartments, and fuse operating means having portions disposed within both of said compartments, manipulation of the portion of said switch operating element disposed within said accessible compartment serving to selectively establish an electrical connection between the portions of said high voltage bushings disposed within said inaccessible compartment, and manipulation of the portion of said fuse operating element disposed within said accessible compartment serving to selectively establish an electrical connection between the portion of one of said high voltage bushings within said inaccessible compartment and the primary winding of the transformer.

8. A self-contained tamper-proof ground level transformer, as set forth in claim 7 in which both said switch operating means and said fuse operating element disposed within said accessible compartment are removably mounted.

9. The combination with an underground power distribution system of sectionalizing means in the form of a plurality of loops connected ground level distribution transformers, each of said ground level transformers comprising a tamper-proof housing including an inaccessible oil containing compartment within which a transformer is mounted and an accessible compartment, a high voltage bushing having one end disposed within said inaccessible compartment and its other end disposed within said accessible compartment, a plurality of secondary bushings each having one end disposed within said inaccessible compartment and its other end disposed within said accessible compartment, a disconnect switch within said inaccessible compartment below the level of oil therein, and a manually operable disconnect switch controlling element having portions disposed within both of said compartments, said disconnect switch being in series connection between the portion of said high voltage bushing disposed within said inaccessible compartment and the primary winding of the transformer, whereby manipulation of the portion of said switch controlling element disposed within said accessible compartment provides the means by which selected portions of the underground power distribution system may be sectionalized by the opening of the disconnected switch.

10. The combination with an underground power distribution system of sectionalizing means in the form of a plurality of loop connected ground level distribution transformers, each of said ground level transformers comprising a tamper-proof housing including an inaccessible oil containing compartment within which a transformer is mounted and an accessible compartment, a high voltage bushing having one end disposed within said inaccessible compartment and its other end disposed within said accessible compartment, a plurality of secondary bushings each having one end disposed within said inaccessible compartment and its other end disposed within said accessible compartment, a fuse disposed within said inaccessible compartment below the level of oil therein, and a manually operable fuse positioning element having portions disposed within both of said compartments, said fuse being in series connection between said switch and the primary winding of the transformer whereby manipulation of said fuse positioning element disposed within said accessible compartment provides the means by which selected portions of the underground power distribution system may be sectionalized by the opening of said fuse.

11. The combination with an underground power distribution system of sectionalizing means in the form of a plurality of loop connected ground level distribution transformers, each of said transformers comprising a tamper-proof housing including an inaccessible oil containing compartment within which a transformer is mounted and an accessible compartment, a pair of high voltage bushings each having one end disposed within said inaccessible compartment and its other end disposed within said accessible compartment, a plurality of secondary bushings each having one end disposed within said inaccessible compartment and its other end disposed within said accessible compartment, a disconnect switch disposed within said inaccessible compartment below the level of oil therein, said disconnect switch serving as a connection means between said pair of high voltage bushings, said disconnect switch having a manually operable portion disposed within said accessible compartment, and a fuse disposed within said inaccessible compartment below the level of oil therein, said fuse having a manually operable portion disposed within said accessible compartment, said fuse being in series connection between one of said high voltage bushings and the primary winding of the transformer whereby manipulation of said manually operable portion of said disconnect switch disposed within said accessible compartment provides the means by which a selected portion of the underground power distribution system may be sectionalized by the isolation of a selected transformer by the opening of said disconnect switch in said selected transformer.

12. The combination with an underground power distribution system of sectionalizing means in the form of a plurality of loop connected ground level distribution transformers, each of said transformers comprising a tamper-proof housing including an inaccessible oil containing compartment within which a transformer is mounted and an accessible compartment, a pair of high voltage bushings each having one end disposed within said inaccessible compartment and its other end disposed within said accessible compartment, a plurality of secondary bushings each having one end disposed within said inaccessible compartment and its other end disposed within said accessible compartment, a disconnect switch disposed within said inaccessible compartment below the level of oil therein, said disconnect switch serving as a connecting means between said pair of high voltage bushings, said disconnect switch having a manually operable portion disposed within said accessible compartment, and a fuse disposed within said inaccessible compartment below the level of oil therein, said fuse having a manually operable portion disposed within said accessible compartment, said fuse being in series connection between one of said high voltage bushings and the primary winding of the transformer whereby manipulation of said manually operable portion of said fuse disposed within said accessible compartment provides the means by which a selected portion of the underground power distribution system may be sectionalized by the isolation of a selected transformer by the opening of said fuse connection in said selected transformer.

References Cited in the file of this patent

UNITED STATES PATENTS

| 1,192,879 | Ferrell | Aug. 1, 1916 |
| 2,918,557 | Link | Dec. 22, 1959 |

FOREIGN PATENTS

| 642,462 | Germany | Mar. 4, 1937 |